July 1, 1941.　　　J. H. KOHLER　　　2,247,505

SEAL

Filed Jan. 13, 1939　　　2 Sheets-Sheet 1

JOSEPH H. KOHLER
INVENTOR.

BY Leon T. Hooper

ATTORNEY.

July 1, 1941.   J. H. KOHLER   2,247,505
SEAL
Filed Jan. 13, 1939   2 Sheets-Sheet 2

JOSEPH H. KOHLER
INVENTOR.
BY Leon T. Hooper
ATTORNEY.

Patented July 1, 1941

2,247,505

UNITED STATES PATENT OFFICE 2,247,505

SEAL

Joseph H. Kohler, Calumet City, Ill.

Application January 13, 1939, Serial No. 250,731

2 Claims. (Cl. 286—8)

This invention relates to an improved seal for rotatable shafts and is especially adapted for use with centrifugal pumps or the like. However, it will be apparent that the employment of the improved seal of this invention is by no means confined to this use.

The present seal provides a structure in which "grinding in" the sealing surfaces of the sealing members, uneven wear during operation, a lubricating pump, and the necessity of stopping the device preparatory to altering the tension exerted against the sealing members are all eliminated.

One of the principal objects of importance and advantage of the improved seal of this invention resides in the provision of means for economically producing a device of the kind referred to which is efficient and extremely long-lived.

Another and further object of importance and advantage resides in the provision of means for utilizing the working surfaces of the sealing members for circulating a lubricant through the improved device.

Still another object of advantage and importance is the provision of means for maintaining the sealing surfaces of the members in fluid tight engagement regardless of misalignment or irregularities in the shaft.

An additional object of advantage and importance resides in the provision of means for adjusting the improved seal of this invention while the machine with which it is associated is in operation or idle.

A still further important object of advantage resides in the provision of means for interchangeably assembling the device, with minor changes, so that either an inside assembly or an outside assembly may be produced.

Additional objects of importance and advantage will become apparent as the following detailed description progresses, reference being had to the accompanying drawings, wherein Fig. 1 is a fragmentary view, partly in section, of a seal which embodies the invention, in association with a stuffing box.

Figure 1:
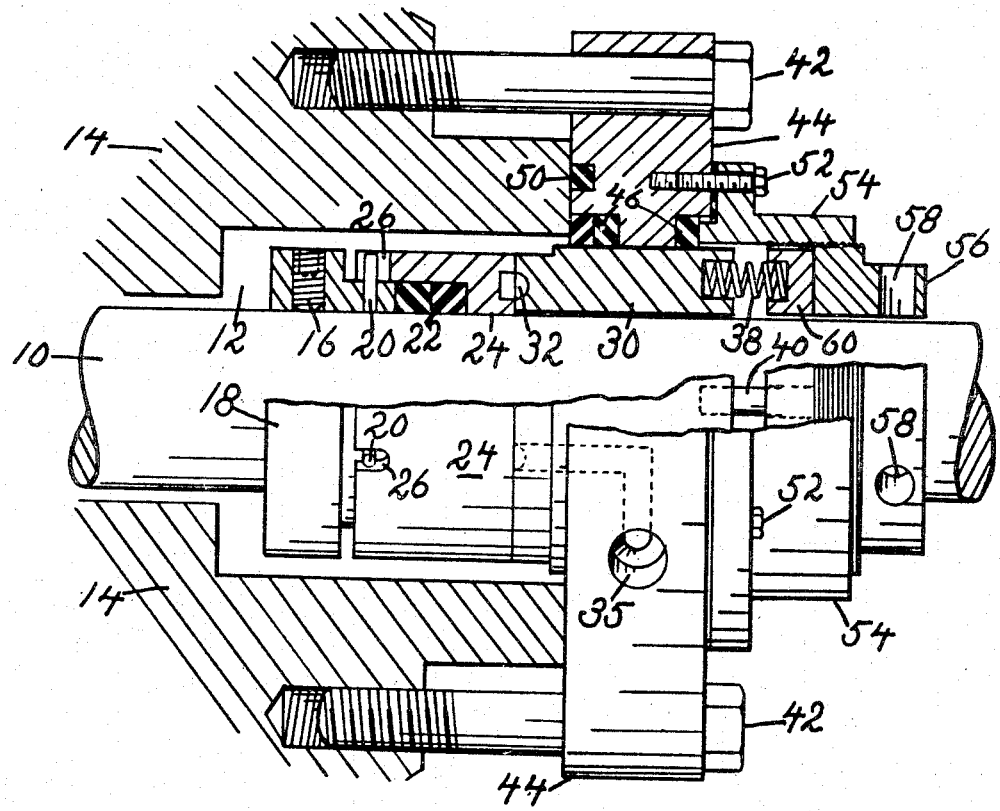
Figure 2:
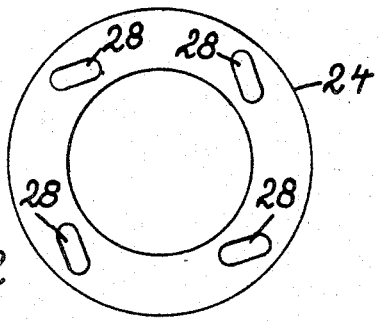
Fig. 2 is a front elevational view of the rotating sealing member.
Figure 4:
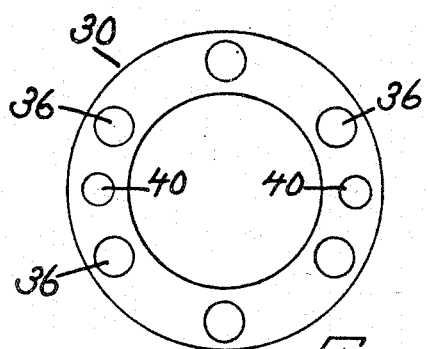
Fig. 4 is a view of the opposite end of the non-rotating sealing member.

The reference numeral 10 indicates a rotatable shaft extending through the stuffing box 12 of a machine 14. Secured to the shaft 10, preferably by set screws 16, one of which is shown in Fig. 1, is an annular collar 18. A portion of the collar 18 is of greater diameter than the balance of the member, as is clearly shown in Fig. 1.

Permanently secured to the restricted portion of the annular collar 18 is a plurality of equally spaced pins 20 which project radially therefrom.

Positioned on the shaft 10 in engagement with the end of the restricted portion of the annular collar 18 is a resilient compressible packing 22. In the preferred embodiment of the invention two compressible packing members 22 are employed to increase the serviceable life of the member and also to positively prevent any leakage whatsoever along the shaft.

Positioned on the shaft 10 and telescoping the packing 22 and the restricted portion of the annular collar 18 is a rotatable sealing member 24. The sealing member 24 is provided with a plurality of spaced pin receiving slots 26 which are in registry with and adapted to receive the pins 20 when the device is assembled.

Formed in the sealing surface of the rotatable sealing member 24 is a plurality of equally spaced indentations 28. The indentations 28 are slightly elongated in plan formation, and one end thereof is at a greater distance from the center of the sealing member than is the other end. The indentations 28 are thus positioned angularly to provide a centrifugal force, when the ring is in motion, to any substance, especially a lubricant, which is contained therein. Consequently, oil picked up by the indentation as it passes the intake opening in the groove 32 is carried along the groove to the end thereof when it is forced through the discharge opening to a reservoir or the like.

Positioned loosely on the shaft 10 in non-rotatable association therewith is a non-rotatable sealing member 30. The rotatable sealing member 24 and also the non-rotatable sealing member 30 are movable, to a slight degree, longitudinally of the shaft 10. Thus when the non-rotatable sealing member is so forced longitudinally along the shaft against the rotatable member, 24, to compress the packing, very tight joints are formed between sealing member 30 and sealing member 24 and between the shaft 10 and the packing 22.

Figure 3:
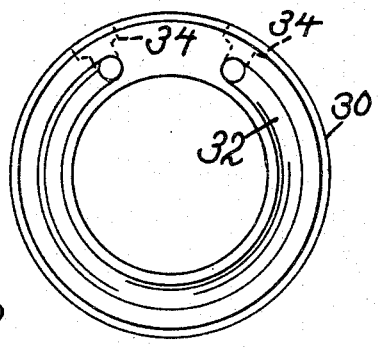
Fig. 3 is an elevation of the non-rotating sealing member showing the sealing face thereof.
Figure 5:
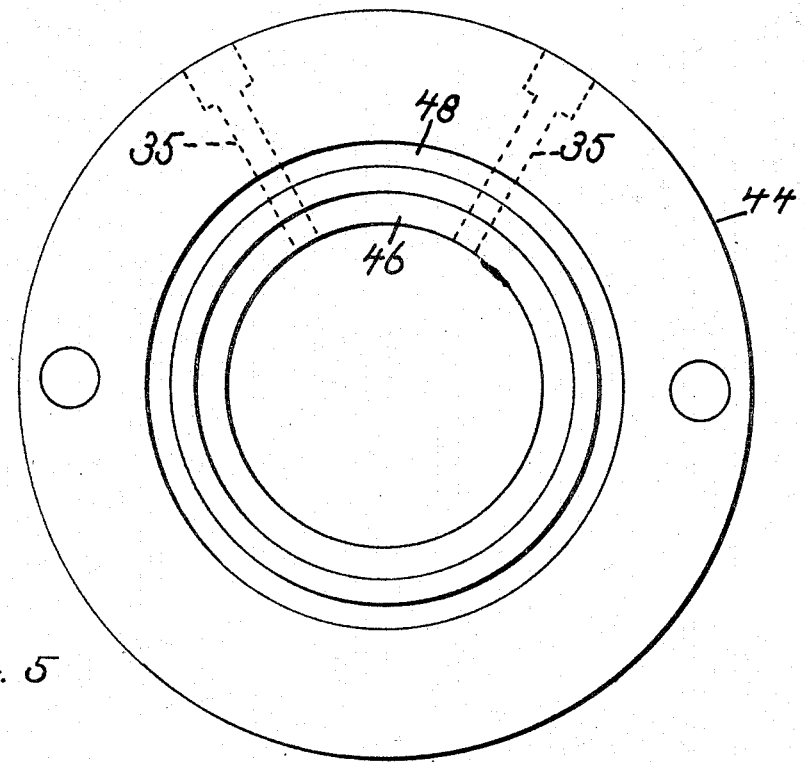
Fig. 5 is an elevational view of the inner side of the gland.

Formed in the sealing surface of the non-rotatable sealing member 30 is a segmental groove 32 which is provided with a passageway 34 at each end thereof extending to the peripheral surface of the member, as is best shown in Fig. 3.

Formed in the opposite face of the non-rotatable sealing member 30 is a plurality of spring receiving recesses 36. The recesses 36 are adapted to receive springs 38 which function to maintain the sealing surfaces of the non-rotatable member 30 and the rotatable member 24 in yieldable engagement.

It is to be understood that the sets of springs 38 may be employed separately, as shown in the drawings, or they may be employed one set on each side of the sealing members. Such a construction would provide a yieldable association between the sealing members, even though the inner springs had been rendered inoperative by corrosion or foreign matter.

Projecting axially from the recessed face of the non-rotatable sealing member 30 is a plurality of securing pins 40.

Figure 6:
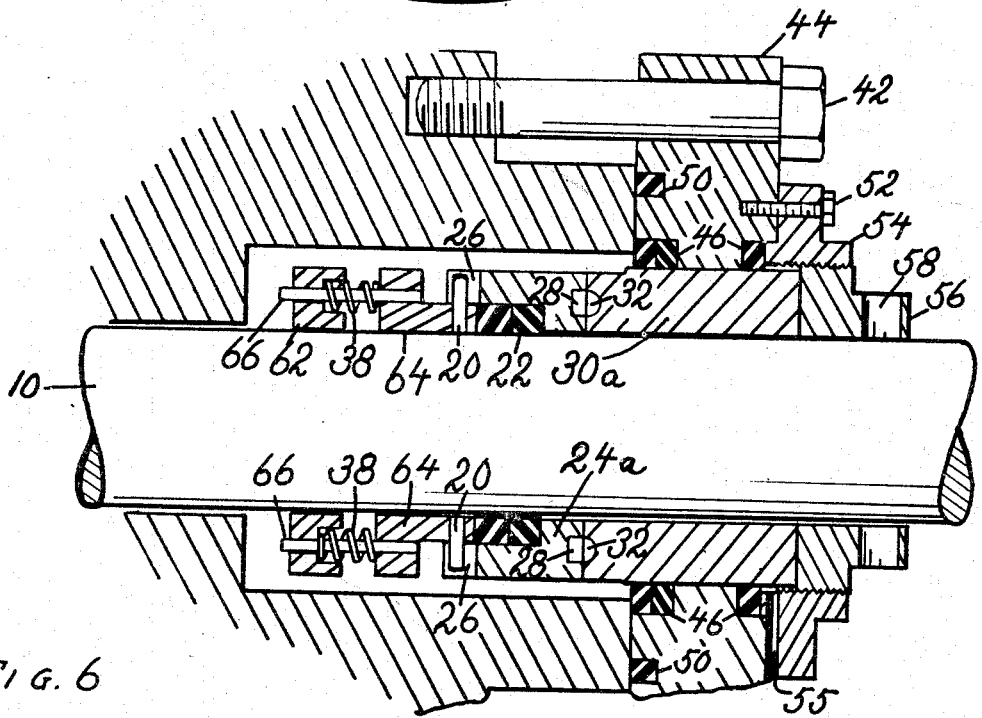
Fig. 6 is a longitudinal section of a slightly modified form of the seal in association with a stuffing box.

Positioned on the non-rotatable sealing member 30 and secured to the machine 14 by bolts 42 is an apertured gland 44. The gland 44 is recessed adjacent the aperture therein to receive compressible packing members 46. The packing members 46 are disposed between the peripheral surface of the non-rotatable sealing member 30 and the recessed portions of the gland 44, as is best shown in Figs. 1 and 6.

Formed in the inner surface of the gland 44 is an annular groove 48 into which a compressible packing member 50 is adapted to be positioned. The packing member 50, together with the packing members 46, provide a means for overcoming any mis-alignment between the gland 44, the machine 14, and the non-rotatable sealing member 30. This construction which also includes compressible packing members 22 between the shaft 10 and the rotatable sealing member 24 insures proper alignment at all times between the sealing faces of the non-rotatable sealing member 30 and the rotatable sealing member 24.

Secured to the outer face of the gland 44, preferably by bolts 52, is a thimble 54. The interior of the thimble 54 in both the preferred and modified forms of the device is threaded and a vent or drain hole 55 is positioned immediately in front of the threads, as is best shown in Fig. 6.

Operably positioned within the thimble 54 is an adjustment member 56. The adjustment member 56 is preferably provided with a plurality of spaced sockets 58 which allow the device to be tightened or slacked off with a conventional rod.

Disposed on the shaft 10 intermediate the adjustment member 56 and the non-rotatable sealing member 30, is an annular member 60. The annular member 60 is recessed to receive one end of the springs 38 and the pins 40.

It is therefore to be observed that the annular member 60 is secured against independent rotation by the pins 40 which project into the non-rotatable sealing member 30, as is best shown in Fig. 1. The non-rotatable sealing member 30 is in turn secured against rotation by frictional contact with the compressible sealing members 46. It is also obvious that the annular collar 18 is secured to the shaft 10 preferably by set screws 16 and drivingly connected with the rotatable sealing member 24 by means of the pins 0 entering the slots 26. The compressible packing 22 interposed between the shaft 10 and also the rotatable sealing member 24 together with the collar 18 and the sealing member 24 rotate with the shaft 10.

In the modified form of the invention, as shown in Fig. 6, as well as in the preferred embodiment of the invention, the passageways 34 in the non-rotatable sealing member 30 are connected to passageways 35 in the gland 44. The passageways 35 are suitably connected with any conventional lubricant supply member. In operation one pair of the associated passageways 35, 34 provides an intake and the other pair of associated passageways 34, 35 provides an outlet.

In the modified form of the invention, as shown in Fig. 6, the springs 38 are in association with the annular collar 62, which in turn is secured to the shaft 10 in the same manner as shown in the preferred embodiment.

Slidably positioned on the shaft 10, between the rotatable sealing member 24a and the annular collar 62, is an intermediate annular member 64. The sealing member 24a is substantially the same as its counterpart in the preferred embodiment. However where it is so desired or required the member may be shortened, as is shown in Fig. 6.

The non-rotatable sealing member 30, with the springs 38 and the pins 40 omitted, may be used in the modified form of the device. However, if it is so desired a sealing member 30a having a flat face to engage the adjusting member 56 may be employed.

Secured to the intermediate annular member 64 and projecting through the compression springs 38 and the collar 62 is a plurality of pins 66. The pins 66 provide a driving connection between the collar 62 and the intermediate member 64.

The inter-changeable feature of the preferred embodiment and the modification of the improved seal of this invention is provided in order that when it is so desired, the springs 38 and the sliding intermediate member 64 and the member 62 are removed from the interior of the stuffing box 12 and the members 16, 18 and 20, substituted therefor. The springs 38 are then interposed between the non-rotatable sealing member 30 and the member 60. This change positions all sliding or movable parts beyond the reach of materials being pumped. Acids or corrosives occasionally render inoperable springs or sliding members which they contact.

It will be apparent from the foregoing that herein is provided a compact and efficient device capable in itself of circulating a lubricant over the working surfaces of the sealing members.

It will also be apparent from the foregoing that herein is provided a device which may be readily adjusted to meet various requirements while the machine is in operation.

It will also be apparent to those skilled in the art to which the device appertains that numerous changes and alterations in construction and design may be made all without departing from the spirit or scope of this invention. Accordingly, it is understood that the patent granted hereon is not to be limited to the preferred embodiment here disclosed nor in any other manner except as necessitated by the terminology of the appended claims when given the range of equivalents to which they may be entitled.

I claim as my invention:

1. In a sealing means for a machine stuffing box on a rotatable shaft which sealing means comprises a stationary sealing member and a rotatable sealing member in end engagement, means for circulating a lubricant over portions of the opposed faces of said sealing members, said means comprising a segmental groove having an inlet and an outlet passageway in the stationary sealing member and a plurality of angularly disposed indentations in the face of the rotatable sealing member, the association of said groove and said angularly disposed indentations providing when the device is in operation centrifugal means for circulating a lubricant.

2. In a machine stuffing box adapted for operation with a rotatable shaft and having sealing means comprising a collar affixed to said shaft to rotate with it, a rotating sealing member connected for rotation with said collar and adapted to move axially of the shaft, a gland member, a non-rotating sealing member sealed against the passage of liquid and affixed against rotation in said gland member, said non-rotating sealing member and said rotating sealing member bearing against each other in liquid sealing contact, and tension means urging the sealing members together; means for lubricating the mutually contacting faces of the sealing members, said means comprising a segmental groove in the face of the non-rotating sealing member, elongated indentations disposed in the face of the rotating sealing member at an angle between the radius and tangent thereof and channel means through the gland and non-rotating sealing member to introduce a liquid lubricant into one end of the said segmental groove and separate channel means to receive said liquid lubricant from the other end of said segmental groove.

JOSEPH H. KOHLER.